(12) United States Patent
Ossareh et al.

(10) Patent No.: US 9,677,481 B2
(45) Date of Patent: Jun. 13, 2017

(54) METHODS AND SYSTEMS FOR BOOST CONTROL

(71) Applicant: Ford Global Technologies, LLC, Dearborn, MI (US)

(72) Inventors: Hamid-Reza Ossareh, Ann Arbor, MI (US); Baitao Xiao, Canton, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 14/740,576

(22) Filed: Jun. 16, 2015

(65) Prior Publication Data

US 2016/0369716 A1     Dec. 22, 2016

(51) Int. Cl.
| F02B 33/44 | (2006.01) |
| F02D 41/00 | (2006.01) |
| F02B 37/12 | (2006.01) |
| F02D 23/00 | (2006.01) |
| F02B 29/04 | (2006.01) |

(52) U.S. Cl.
CPC .......... *F02D 41/0007* (2013.01); *F02B 29/04* (2013.01); *F02B 37/127* (2013.01); *F02D 23/00* (2013.01)

(58) Field of Classification Search
CPC ...... F02D 41/0007; F02D 23/00; F02B 29/04; F02B 37/127
See application file for complete search history.

(56) References Cited

U.S. PATENT DOCUMENTS

| 7,529,614 | B1 | 5/2009 | Müller | |
| 8,739,530 | B2 | 6/2014 | Bjorge et al. | |
| 9,181,859 | B2 * | 11/2015 | Glugla | F02B 37/18 |
| 2004/0194466 | A1 * | 10/2004 | Kawamura | F02B 33/34 |
| | | | | 60/612 |
| 2009/0107140 | A1 * | 4/2009 | Pursifull | B60W 10/10 |
| | | | | 60/600 |
| 2011/0270511 | A1 * | 11/2011 | Kurtz | F02M 26/15 |
| | | | | 701/105 |
| 2012/0029749 | A1 * | 2/2012 | Ulrey | B60W 10/06 |
| | | | | 701/22 |
| 2014/0137553 | A1 * | 5/2014 | Ulrey | F02B 37/16 |
| | | | | 60/602 |
| 2014/0174079 | A1 * | 6/2014 | Kemmer | F02B 37/12 |
| | | | | 60/615 |
| 2014/0260241 | A1 | 9/2014 | Jankovic et al. | |
| 2014/0305412 | A1 * | 10/2014 | Ahrns | F02B 37/14 |
| | | | | 123/562 |

(Continued)

*Primary Examiner* — Jesse Bogue
(74) *Attorney, Agent, or Firm* — Julia Voutyras; McCoy Russell LLP

(57) ABSTRACT

Methods are provided for improving boost pressure control in a boosted engine system. In one example, in response to an operator actuated tip-in of an accelerator pedal, an air bypass around an air compressor supplying air to an air inlet of an engine may be opened for a predetermined time, and after the predetermined time, said air bypass may be increased in response to a ratio of outlet pressure to inlet pressure of said compressor being at or around a hard surge limit. In this way, by increasing the opening of the air bypass, compressor operation may be moved out of a hard/soft surge region.

17 Claims, 4 Drawing Sheets

(56) References Cited

U.S. PATENT DOCUMENTS

| | | | |
|---|---|---|---|
| 2014/0305413 A1* | 10/2014 | Ahrns | F02B 37/14 |
| | | | 123/562 |
| 2014/0325979 A1* | 11/2014 | Morelli | F02B 37/183 |
| | | | 60/599 |
| 2015/0047343 A1 | 2/2015 | McConville et al. | |
| 2015/0285191 A1* | 10/2015 | Kitada | H01M 8/04201 |
| | | | 60/605.2 |
| 2015/0345371 A1* | 12/2015 | Russ | F02D 23/00 |
| | | | 123/542 |

* cited by examiner

METHODS AND SYSTEMS FOR BOOST CONTROL

FIELD

The present application relates to methods for adjusting compressor recirculation valve actions to improve boost control.

BACKGROUND/SUMMARY

Engine systems may be configured with boosting devices, such as turbochargers or superchargers, for providing a boosted air charge and improving peak power outputs. In the turbocharged engines, airflow to the engine (hence the torque) may be regulated through the action of a throttle located at the engine intake. The boost pressure may be regulated through the actions of an exhaust bypass or wastegate (WG) coupled across an exhaust turbine and an air bypass or compressor recirculation valve (CRV) coupled across an intake compressor. The exhaust bypass may regulate the boost pressure by controlling the exhaust gas flow over the turbine (hence the power delivered to the compressor) and the air bypass may be commonly used for compressor surge management.

Typically during a tip-in where increased torque is demanded, the exhaust bypass is fully closed and the air bypass is also fully closed to provide increased power to the turbocharger as shown by Jankovic et. al. in US 20140260241, for example. By immediately closing both the exhaust bypass and the air bypass when torque demand is high, the air that is delivered to the engine is increased thereby increasing power that is delivered to the turbocharger. As a result, the boost pressure builds up.

The inventors however have recognized an approach to further increase the boost response and reduce turbo lag. In one example, the boost pressure may be increased by a method comprising: in response to an operator demand for additional torque from an engine (e.g., during tip-in), opening an air bypass around an air compressor which supplies air to said engine; and keeping said air bypass opened for a predetermined time and then closing said air bypass.

As one example, the air bypass may be opened in response to the said additional torque demand being greater than a threshold value. During the predetermined time when the air bypass is open, the boost pressure may not build up but the compressor may spin faster. Additionally, the turbo speed may rise at a faster rate when the air bypass is initially open. At the end of the predetermined time, when the air bypass is closed, this increased compressor speed then translates into achieving desired boost levels in less time than heretofore possible. In this way, turbo lag is decreased. Once the boost pressure reaches the target threshold, the throttle, the exhaust bypass, and the air bypass may be actively controlled to maintain the boost at the desired threshold. Overall, boosted engine performance is improved and turbocharger lag may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 show a high level flow chart for opening an air bypass for a predetermined time during tip-in.

DETAILED DESCRIPTION

Figure 1:
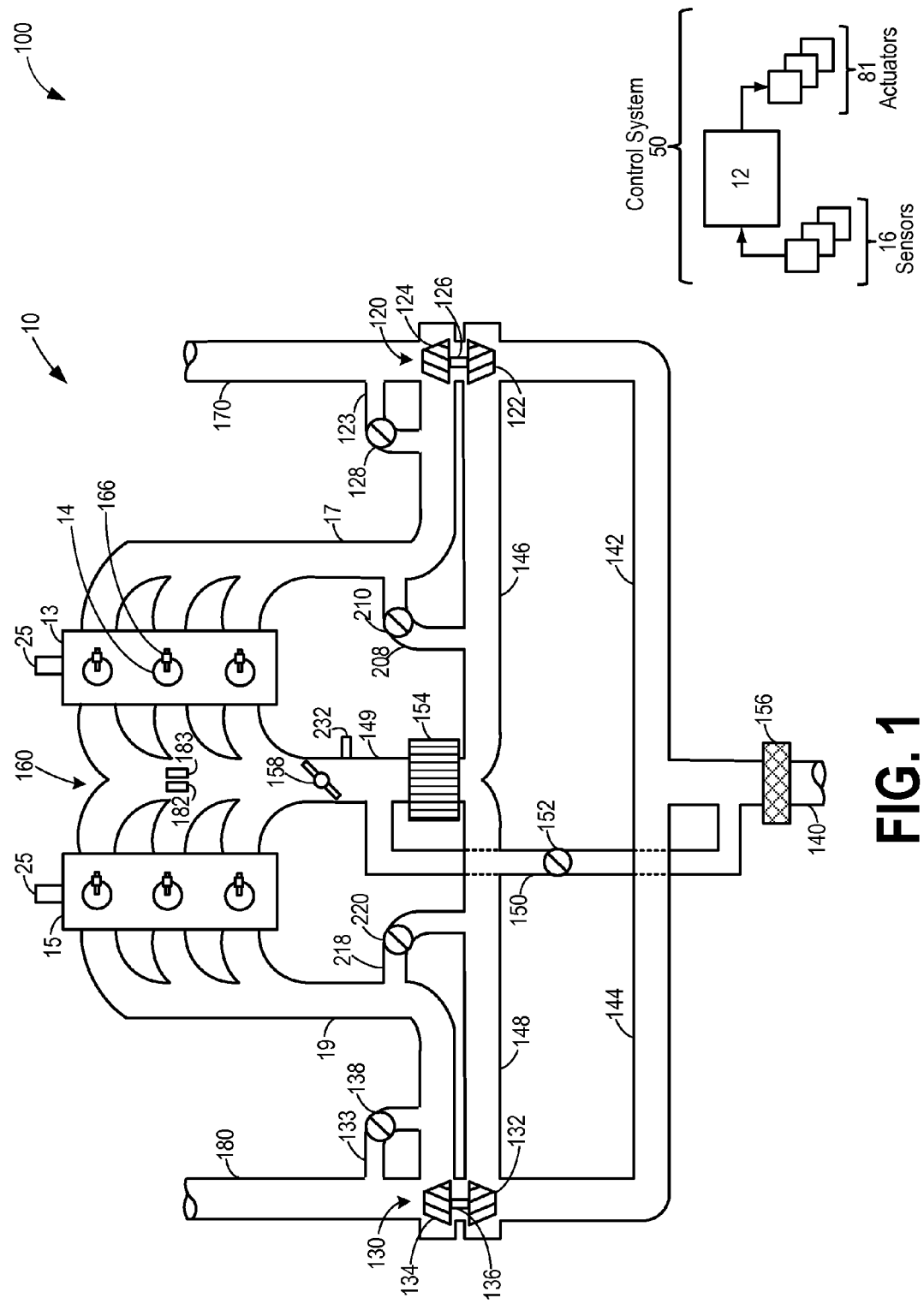
FIG. 1 shows a schematic depiction of an example boosted engine system.
Figure 3:
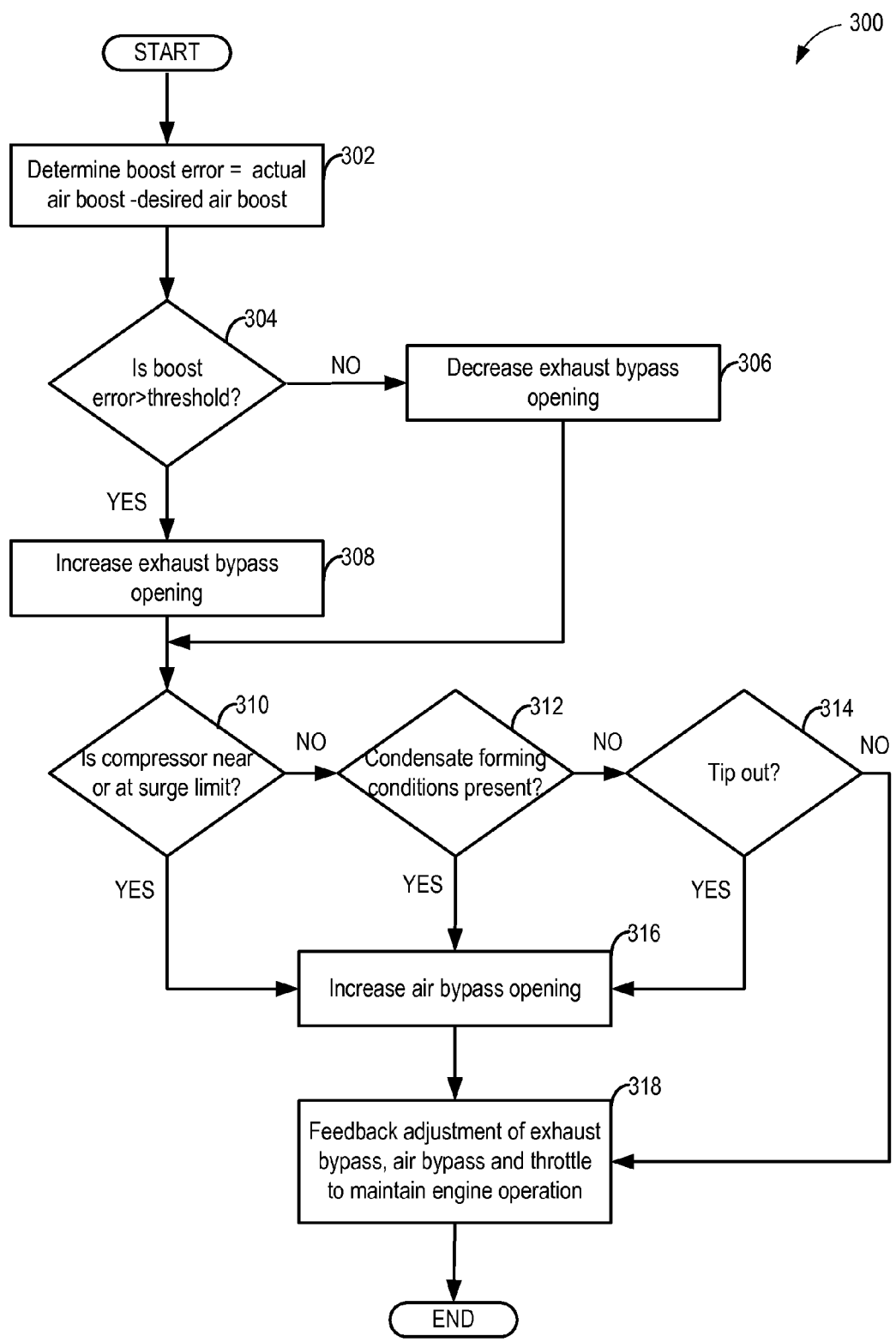
FIG. 3 shows a high level flow chart for adjusting an exhaust bypass and the air bypass based on a difference between an actual air boost and a desired air boost.
Figure 4:
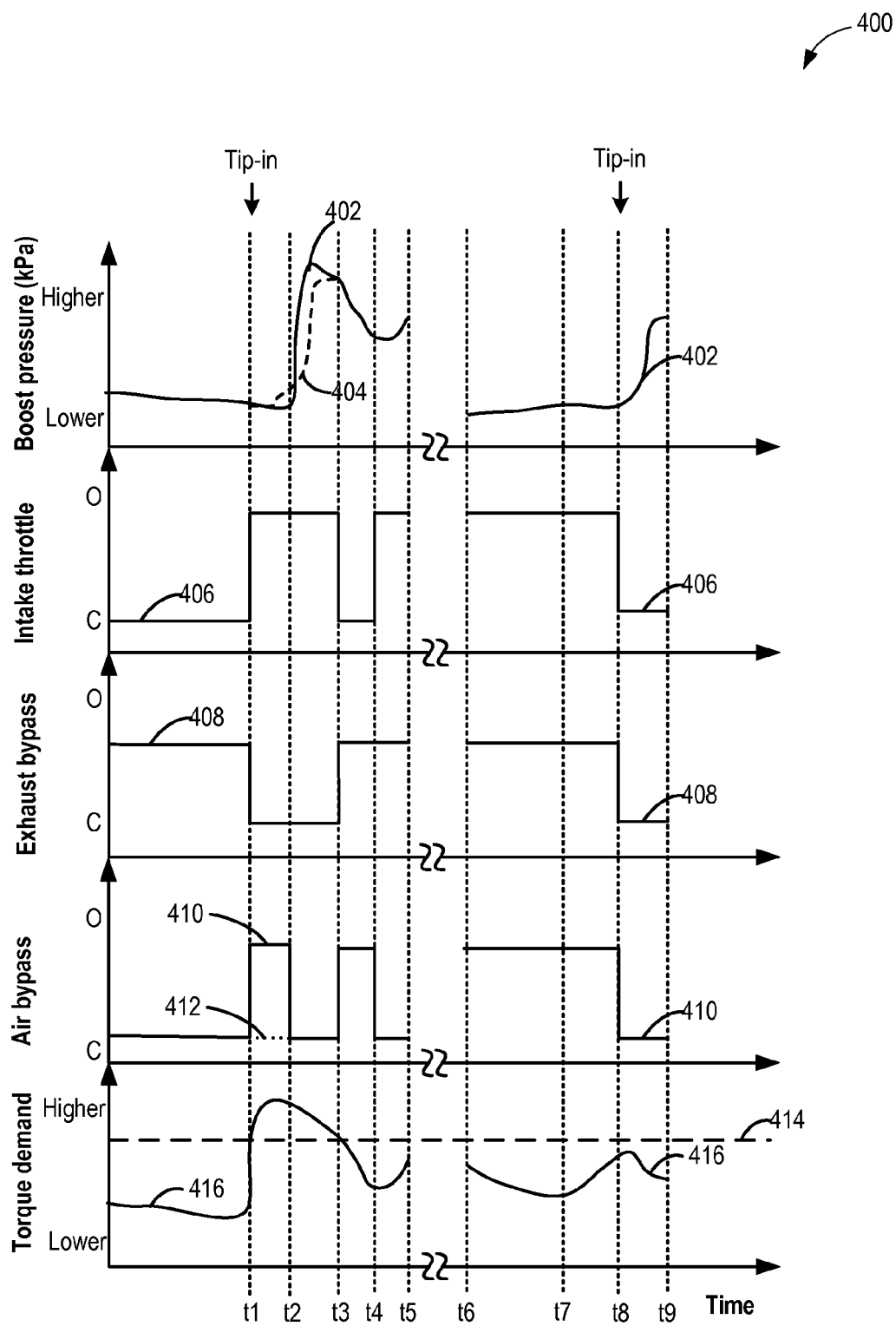
FIG. 4 shows an example coordination of the exhaust bypass, the air bypass, and an intake throttle adjustments to provide a desired boost pressure, according to the present disclosure.

The following description relates to systems and methods for improving boost pressure control in a boosted engine system, such as the system of FIG. 1. During tip-in, when an operator requested torque demand is high, a controller may be configured to perform a routine, such as the routine of FIG. 2, to open (or maintain open) an air bypass coupled across an intake compressor of the engine system for a predetermined time. Keeping the air bypass open during tip-in enables the compressor to spin faster. Once the predetermined time has elapsed, the air bypass may be closed, which further translates the high compressor speeds to high boost levels. The controller may further perform a routine, such as the routine of FIG. 3, to adaptively adjust each of an exhaust bypass coupled across an exhaust turbine, the air bypass and an intake throttle, to maintain the boost at the desired levels. An example adjustment is shown in FIG. 4. In this way, higher boost levels may be achieved.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. Engine system 100 may be a split-engine system wherein intake passage 140 is branched downstream of air filter 156 into first and second parallel intake passages, each including a turbocharger compressor. In the resulting configuration, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with a controller 12. Intake passage 149 may include an air cooler (also referred to as a heat exchanger) 154 and an air intake throttle 158. The position of intake throttle 158 can be adjusted by a control system 50 via a throttle actuator (not shown) communicatively coupled to a controller 12.

A compressor recirculation passage 150 may be provided for compressor control after throttle tip-in, torque control, control of condensate formation in an intake air cooler, and compressor surge control. For example, to reduce compressor surge, such as on a driver tip-out, boost pressure may be dumped from the intake manifold, downstream of air cooler 154 and upstream of intake throttle 158, to intake passage 140 (in particular, downstream of air filter 156 and upstream of the junction of intake passages 142 and 144). By flowing boosted air from upstream of an intake throttle inlet to upstream of the compressor inlets, boost pressure may be rapidly reduced, expediting boost control. Flow through compressor recirculation passage 150 may be regulated by adjusting the position of an air bypass or a compressor recirculation valve (also known as compressor surge valve) 152 positioned therein. In some embodiments, the air bypass 152 may be configured as a two-position valve adjustable to one of a fully closed and a fully open position. In other embodiments, the air bypass 152 may be a continuously variable valve whose position can be adjusted to a fully open position, a fully closed position, or any position therebetween. Thus air bypass 152 may also be referred to herein as a continuously variable compressor recirculation valve, or CCRV. In the depicted example, the air bypass 152 is configured as a throttle valve, although in other embodiments, the air bypass may be configured differently (e.g., as a poppet valve). It will be appreciated that while the air bypass is shown configured for a V-6 twin turbocharged engine in FIG. 1, the air bypass may be similarly applied in other engine configurations, such as applied to I-3, I-4, V-8, and other engine configurations with one or multiple turbochargers. In an alternate configuration, the compressor recirculation passage 150 may be located such that flow travels from upstream of air cooler 154 to a location upstream of compressors 120 and 130. In another configuration, there may be two recirculation paths, each with an air bypass, each located such that flow travels from the compressor exit to the compressor inlet.

Engine 10 may include a plurality of cylinders 14. In the depicted example, engine 10 includes six cylinders arranged in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by an exhaust bypass or wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by an exhaust bypass or wastegate 138.

In some examples, exhaust turbines 124 and 134 may be configured as variable geometry turbines, wherein the controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein the controller 12 may adjust the position of the turbine nozzle to vary the level of energy that is obtained from the exhaust gas flow and imparted to their respective compressor. For example, the control system 50 can be configured to independently vary the vane or nozzle position of the exhaust gas turbines 124 and 134 via respective actuators.

Figure 2:
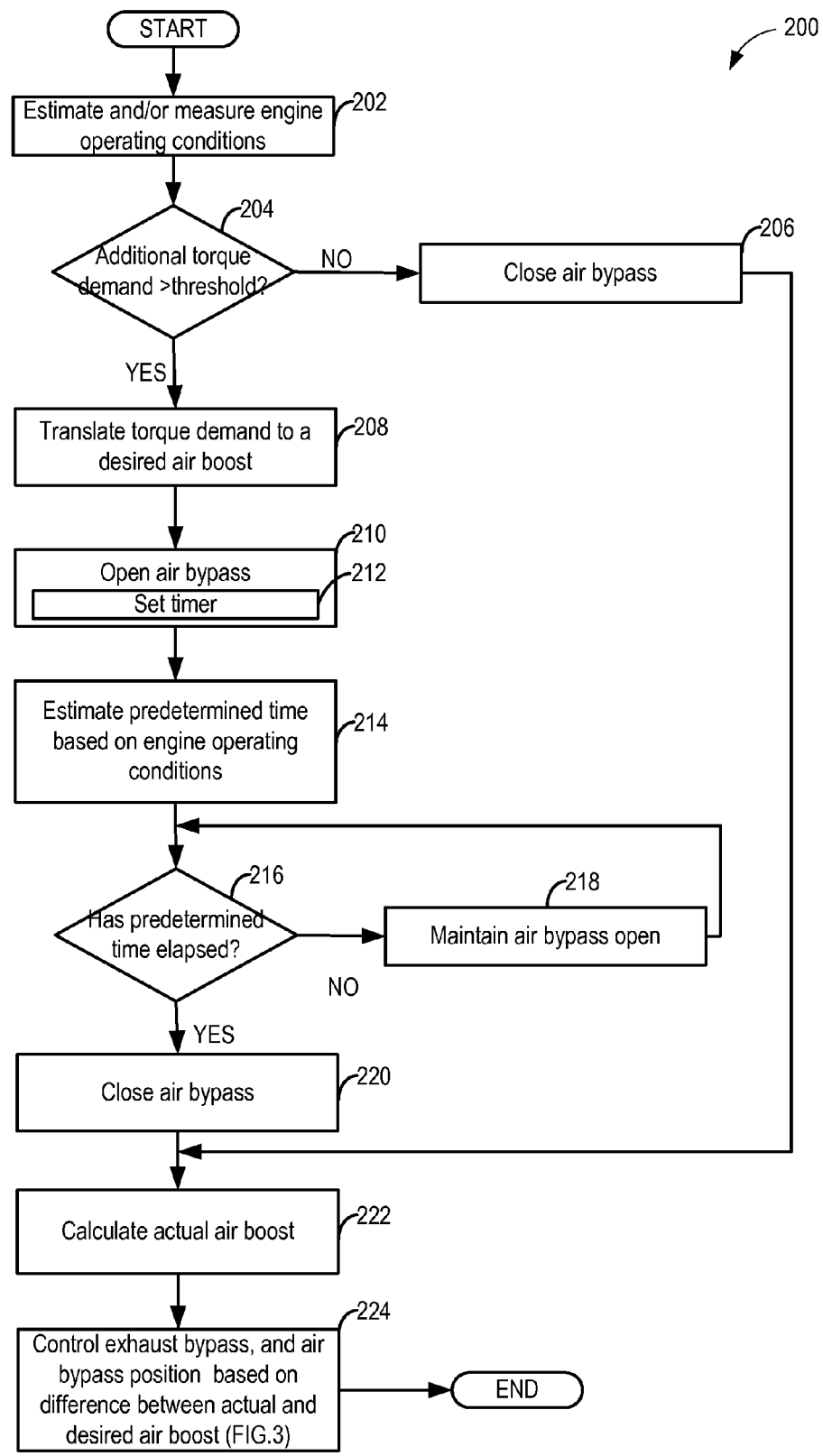

During tip-in when an increased torque is desired, typically the exhaust bypass 128, 138 may be closed, and the throttle 158 may be fully open and the air bypass 152 may be fully closed. Together, these actions ensure that increased air is delivered to the engine and power delivered to the turbocharger is increased. As a result, boost pressure may build up slowly until it reaches a target set-point. However, the inventors have identified a potential usage of the air bypass valve to further increase the boost response. Specifically, by keeping the air bypass valve open initially during tip-in for a predetermined time (as shown in FIG. 2), the compressor speed, and thus the turbocharger speed, may be increased as explained below.

The compressor power balance equations are given as.

$$\dot{N}_{tc} = \frac{1}{J_{tc} N_{tc}} (H_t - H_c) \quad (1)$$

$$H_c = \frac{1}{\eta_c} w_C T_c^{in} C_{p,c} \left[ \left( \frac{P_c^{out}}{P_c^{in}} \right)^{\frac{\gamma_c - 1}{\gamma_c}} - 1 \right] \quad (2)$$

where $H_t$ is the turbine enthalpy, $H_c$ is the compressor enthalpy, is the turbo speed, $w_c$ is the compressor flow, $C_{p,c}$ is the specific heat capacity at constant pressure, is the compressor inlet temperature, is the compressor outlet pressure (boost), is the compressor inlet pressure, is the specific heat ratio, is the isentropic compressor efficiency. The specific values of these parameters depend on the engine as well as the operating conditions of the said engine.

During tip-in, when the air bypass is left open, the pressure ratio stays almost close to 1

$$\left( \text{that is, } \frac{P_c^{out}}{P_c^{in}} \sim 1 \right),$$

so $H_c$ is a negligible term. Therefore, $$\dot{N}_{tc} = \frac{1}{J_{tc}N_{tc}} H_t \qquad (3)$$

and thus the turbo speed rises at a faster rate compared to when the air bypass is closed.

Once the turbocharger speed reaches a threshold speed (or threshold time elapsed), the air bypass may be closed. By closing the air bypass, the increased turbocharger speed may be translated to higher boost levels. In this way, it may be possible to achieve higher boost levels at a shorter time. Once the boost pressure reaches the target threshold, the throttle, the exhaust bypass, and the air bypass may be actively controlled to maintain the boost at the desired threshold as shown in FIG. 3.

The exhaust bypass or wastegate actuators regulate boost pressure by controlling exhaust flow over the corresponding turbines. However, in contrast to the actuation of the air bypass valves, the impact of exhaust bypass actuation on boost pressure is substantially slower due to slower turbocharger dynamics. Specifically, to change boost pressure, the exhaust bypass first needs to accelerate the turbine and the compressor (since they are connected on the same shaft). A controller controls exhaust bypass action via feed-forward and feedback components. The feed-forward component responds to the desired (reference) boost pressure and the operating conditions, while the feedback component responds to the difference between the actual (measured or estimated) boost pressure and the desired boost pressure. The feedback adjustment responsive to boost pressure regulation error adjusts the opening of the exhaust bypass to achieve accurate steady-state boost pressure regulations in the presence of uncertainties and external disturbances. However, any action of the air bypass, as well as the intake throttle (which also has a substantially immediate impact on boost pressure), can confound the exhaust bypass control which is not fast enough to cancel the effect of the compressor recirculation valve or the intake throttle.

During nominal engine operating conditions, the air bypass 152 may be kept nominally closed, or nearly closed. In such a position, the valve may be operating with known or negligible leakage. Then, in response to surge, an opening of the air bypass 152 may be increased. In some embodiments, one or more sensors may be coupled in the compressor recirculation passage 150 to determine the mass of recirculated flow delivered from the throttle inlet to the intake passage. The various sensors may include, for example, pressure, temperature, and/or flow sensors. In addition, by coordinating the operation of the air bypass with those of the exhaust bypass, boost response and surge margins may be increased.

Hot charge air (boosted air) from the compressor 122 and 132 enters the inlet of the air cooler 154 (also known as compressed air cooler (CAC) or heat exchanger), cools as it travels through the air cooler, and then exits to pass through the throttle 158 and then enter the engine intake manifold 160. Ambient air flow from outside the vehicle may enter engine 10 through a vehicle front end and pass across the air cooler, to aid in cooling the charge air. Condensate may form and accumulate in the air cooler when the ambient air temperature decreases, or during humid or rainy weather conditions, where the charge air is cooled below the water dew point temperature. Further, when the charge air entering the air cooler is boosted (e.g., boost pressure and/or air cooler pressure is greater than atmospheric pressure), condensate may form if the air cooler temperature falls below the dew point temperature. Further, if condensate builds up in the air cooler, it may be ingested by the engine during times of increased airflow. As a result, unstable combustion and/or engine misfire may occur.

An induction pressure may be measured at the outlet of the air cooler, before the throttle 158. As such, the induction pressure may be referred to as a pre-throttle pressure. In one example, the induction pressure may be determined with a sensor, such as sensor 232. A ratio between the induction pressure and atmospheric pressure may be referred to as an induction pressure ratio. A ratio between an air cooler pressure (may be the induction pressure or an average CAC pressure) may be referred to as an air cooler pressure ratio. When the air cooler pressure ratio and/or the induction pressure ratio are greater than 1, the induction pressure is greater than atmospheric pressure and the engine is operating under boosted conditions. Thus, when the induction pressure ratio is greater than 1, condensate may form in the air cooler. However, if the induction pressure ratio is maintained at or below 1, condensate may not form. In this way, reducing the induction pressure ratio from above 1 to 1 or below may reduce air cooler condensate formation.

The exhaust gases in the first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust aftertreatment devices, such as a catalyst, and one or more exhaust gas sensors.

In some embodiments, engine 10 may further include one or more exhaust gas recirculation (EGR) passages for recirculating at least a portion of exhaust gas from first and second parallel exhaust passages 17 and 19 and/or first and second parallel branched exhaust passages 170 and 180, to first and second parallel intake passages 142 and 144, and/or parallel branched intake passages 146 and 148 or intake manifold 160. These may include high-pressure EGR loops for providing high-pressure EGR (HP-EGR) and low-pressure EGR-loops for providing low-pressure EGR (LP-EGR). When included, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously. The low-pressure EGR loops may recirculate at least some exhaust gas from each of the branched parallel exhaust passages, downstream of the exhaust turbine, to the corresponding parallel intake passage, upstream of the compressor. Each of the LP-EGR loops may have corresponding LP-EGR valves, for controlling exhaust flow through the LP-EGR loop, as well as respective charge air coolers for lowering a temperature of exhaust gas recirculated to the engine intake. The high-pressure EGR loops may recirculate at least some exhaust gas from each of the parallel exhaust passages, upstream of the exhaust turbine, to the corresponding parallel intake passage, downstream of the compressor. EGR flow through the HP-EGR loops may be controlled via respective HP-EGR valves and HP-EGR charge air coolers.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by the control system 50 including controller 12 and by input from a vehicle operator via an input device (not shown). Control system 50 is shown receiving information from a plurality of sensors 16 (various examples of which are described herein) and sending control signals to a plurality of actuators 81. As one example, sensors 16 may include a humidity sensor, MAP sensor 182, and MCT sensor 183. In some examples, common intake passage 149 may include a throttle inlet pressure (TIP) sensor 232 for estimating a throttle inlet pressure, also referred to as the boost pressure, and/or a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210 and 220, LP-EGR valves (not shown), throttle valve 158, and wastegates 128, 138. Other actuators, such as a variety of additional valves and throttles, may be coupled to various locations in engine system 100. The controller 12 receives signals from the various sensors of FIG. 1 and employs the various actuators of FIG. 1 to adjust engine operation based on the received signals and instructions stored on a memory of the controller.

FIG. 2 illustrates an example method 200 to open an air bypass for a predetermined time during tip-in. Specifically, when a large enough torque is desired, the air bypass may be not be closed immediately, but may be closed with a delay, to increase boost. Instructions for carrying out method 200 and the rest of the methods (e.g., method 300) included herein may be executed by the controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1, to adjust engine operation, according to the methods described below.

At 202, the routine includes estimating and/or measuring engine operating conditions. These include, for example, pedal position, torque demand, boost demand, turbine speed, compressor inlet temperature, engine temperature, MAP, MAF, boost pressure, throttle inlet pressure, induction pressure, humidity, etc. At 204, the method includes determining if there is a sudden increase in torque demand (e.g., due to a tip-in). For example, it may be determined if the torque demand has increased by more than a threshold amount within a threshold time (e.g., transient increase in torque demand), and/or whether an accelerator pedal has been depressed by more than a threshold amount. Tip in may be a tip-in from idle conditions (e.g., with pedal at substantially released position) or from steady-state cruising conditions (e.g., with pedal partially depressed).

If the torque demand is greater than the threshold (or tip-in is confirmed), then method 200 proceeds to 208 where the torque demand is translated into a desired air boost. For example, the desired boost may be based upon transmission gear and weight of the vehicle driven by the engine and incline of a road upon which the vehicle is travelling. As an example, when the vehicle climbs up a steep slope, the desired boost may be higher. However, when the vehicle is coming down a slope, the desired boost may be lower, for example. The conditions assessed may be directly measured with sensors, such as sensors temperature sensor, MAF sensor, MAP sensor, throttle inlet pressure sensor, and pedal position sensor, for example, and/or the conditions may be estimated from other engine operating conditions. The engine operating conditions may include engine coolant temperature, engine oil temperature, mass airflow (MAF), manifold pressure (MAP), boost (for example, from boost pressure sensor), engine speed, idle speed, barometric pressure, a driver-demanded torque, air temperature, vehicle speed, etc.

Method 200 then proceeds to 210 where an air bypass around an air compressor is opened (or maintained open). For example, if a tip-in large enough to require boost is detected, and prior to this tip-in, boost was not required or boost level was small, then the air bypass is opened immediately. However, if the air bypass was already open prior to tip-in (for surge mitigation, for example), then the air bypass is maintained open at 210. The technical effect of opening the air bypass for a predetermined time is that the compressor spins faster and thus, the turbo speed rises at a faster rate, as explained with reference to equations 1-3. In some embodiments, the air bypass or the compressor recirculation valve may be a configured as a two-position wherein, opening the air bypass includes adjusting the air bypass to a fully open position. However, in some other embodiments, the air bypass may be a continuously adjustable valve, therein, the air bypass may be adjusted to a position closer to the fully open position. Next at 212, a timer is set.

At 214, a predetermined time is estimated based on engine operating conditions. For example, the predetermined time may be calibrated to allow fast speed up of the compressor. For example, the predetermined time may be based on the time it takes for the turbo speed to reach a threshold speed (60,000 rpm for example). As another example, the predetermined time may be a preset duration (say, 400 ms, for example).

Method 200 then proceeds to 216, where it may be determined if the predetermined time has elapsed. For example, when the preset duration (as determined by the timer) ends, the predetermined time may be considered elapsed. As another example, when the turbo speed reaches a threshold, the predetermined time may be considered elapsed, and the method proceeds to 220 where the air bypass may be closed. However, if the predetermined time has not elapsed when checked at 216, method proceeds to 218, where the air bypass is maintained open, until the predetermined time has elapsed. This initial opening of the air bypass may reduce boost build up initially. However, once the predetermined time has elapsed, then method proceeds to 220 where the air bypass is closed. When the air bypass is configured as the two-position valve, closing the air bypass includes adjusting the air bypass to a fully closed positions. However, when the air bypass includes continuously variable valve positions, closing the air bypass includes adjusting the air bypass to a position closer to a fully closed position. The technical effect of the delayed closing of the air bypass is that the faster turbocharger speed translates to higher boost levels. In this way, by delaying the closing of the air bypass, the boost may be built up rapidly, and the time to torque may be decreased.

Returning to 204 of method, if the torque demand is lower than the threshold when checked at 204, method proceeds to 206 where the air bypass is closed without any delay. By closing the air bypass without any delay when the torque demand is lower than the threshold, the time to torque may be increased. After closing the air bypass, the method proceeds to 222 where the actual air boost may be calculated. The actual boost level that is reached may be directly measured with sensors, such as sensors temperature sensor, MAF sensor, MAP sensor, throttle inlet pressure sensor, and pedal position sensor, for example, and/or the conditions may be estimated from other engine operating conditions. The engine operating conditions may include engine coolant temperature, engine oil temperature, mass airflow (MAF), manifold pressure (MAP), boost (for example, from boost pressure sensor), engine speed, idle speed, barometric pressure, a driver-demanded torque, air temperature, vehicle speed, etc. Next, method 200 then proceeds to 224 where the exhaust bypass and the air bypass may be controlled based on a difference between the actual air boost and the desired air boost, as explained in FIG. 3.

Thus, an example method includes, in response to an operator demand for additional torque from an engine, opening an air bypass around an air compressor which supplies air to the engine and keeping the air bypass opened for a predetermined time and then closing the air bypass. The air bypass may be opened in response to the additional torque demand being greater than a threshold value. Further, the keeping open and closing of the air bypass may all occur while the operator demand continues to exist. The predetermined time may be calibrated to allow fast speed up of said compressor while achieving the additional torque after the closing. The compressor may be driven by a turbine coupled to an exhaust of said engine. The operator demand may be translated to a desired air boost from the compressor. The method further includes controlling an exhaust bypass around the turbine to control air boost from the compressor, said control being responsive to a difference between the desired air boost and an actual air boost (shown in FIG. 3). The method further includes controlling the air bypass after the predetermined time in response to said difference between said desired air boost and said actual air boost as explained in FIG. 3.

Turning now to FIG. 3, an example method 300 for adjusting an exhaust bypass and the air bypass based on a difference between an actual air boost and a desired air boost is shown. Specifically, after the initial tip-in when the air bypass is closed after a delay, the opening of each of the exhaust bypass, the air bypass, and the throttle may be adaptively adjusted based on engine operating conditions.

At 302, a boost error may be determined. As such, the boost error may be the difference between the actual air boost and the desired air boost. After the initial tip-in, when the air bypass is closed after a delay, the faster turbocharger speed may translate into reaching higher boost levels in less time than in prior approaches. The actual boost level that is reached may be directly measured with sensors, such as temperature sensor, MAF sensor, MAP sensor, throttle inlet pressure sensor, and pedal position sensor, for example, and/or the conditions may be estimated from other engine operating conditions. The engine operating conditions may include engine coolant temperature, engine oil temperature, mass airflow (MAF), manifold pressure (MAP), boost (for example, from boost pressure sensor), engine speed, idle speed, barometric pressure, a driver-demanded torque, air temperature, vehicle speed, etc. Once the actual boost is determined, the boost error may be calculated by subtracting the desired boost (as determined at 208 of method 200) from the actual boost. Based on the boost error, the exhaust bypass may be adjusted. As such, the exhaust bypass regulates the boost pressure by controlling the gas flow over the turbine and hence the power delivered to the compressor. Any adjustments to the exhaust bypass results in a change in boost pressure, however due to turbocharger inertia, the boost pressure change occurs relatively slowly.

Method 300 proceeds to 304 where it is determined if the boost error is greater than a threshold (zero, for example). If the boost error is greater than the threshold, indicating that the actual air boost is greater than the desired air boost, then method 300 proceeds to 308 where the exhaust bypass opening may be increased. By increasing the exhaust bypass opening (or feedback adjusting the exhaust bypass), the exhaust manifold pressure and the turbine inlet pressure are decreased, thereby reducing turbine speed and consequently turbine power.

However, if the boost error is below the threshold when checked at 304, method proceeds to 306 where the exhaust bypass opening may be decreased. By decreasing the exhaust bypass opening, exhaust manifold pressure and turbine inlet pressure is increased. This raises turbine speed and consequently turbine power.

In some embodiments, the exhaust bypass opening may be adjusted based on the desired air boost (feed-forward adjusting). For example, if a higher air boost is desired, the exhaust bypass may be closed (or adjusted to a position that is more closed). As desired air boost decreases, the exhaust bypass may be opened (or adjusted to a position that is more open), for example. In this way, the exhaust bypass may be adjusted based on the desired air boost. Further to the feed-forward adjustment to the exhaust bypass, the boost error may be determined and the exhaust bypass may be subsequently adjusted based on the boost error (feed-back adjustment) as explained earlier.

Subsequent to feedback adjustment of the exhaust bypass at 306 and 308, method proceeds to 310, where it may be determined of the compressor is near or at surge limit. As such, the impact of opening or closing the air bypass on the boost pressure is substantially immediate thus allowing boost and surge control. Compressor surge is an undesirable condition which may occur when a high compressor speed results in more air being compressed than the engine can intake at a given time. Compressor operation in a surge region results in objectionable NVH and perhaps degradation of engine performance. At 310, method 300 includes determining whether turbocharger compressor operating point is near or at surge limit. For example, the controller (e.g., controller 12 of FIG. 1) may make the determination based on sensed values of parameters such as turbocharger shaft speed, inlet and outlet pressure of compressor, compressor flow rate, etc. For example, the compressor may be determined to be at or around a surge limit when the ratio of the outlet pressure to the inlet pressure of the compressor is greater than a threshold (2, for example). If it is determined at 310 that the compressor is near or at surge limit, then method 300 proceeds to 316, where the air bypass opening may be increased (feed-forward adjustment of air bypass). Thus, by increasing the opening of the air bypass, compressor operation may be moved out of a hard/soft surge region. In doing so, surge is immediately reduced, and boosted engine performance is improved. However, continuously recirculating the air around the compressors can lead to fuel economy losses as the extra compressor work has to be made up by additional turbine work. The increased turbine work typically leads to higher exhaust pressures and increased engine pumping work. Method proceeds to 318, where each of the exhaust bypass, the air bypass, and the throttle may be adaptively adjusted to maintain engine operation.

For example, the exhaust bypass may closed as the desired boost pressure increases. By closing the exhaust bypass, exhaust manifold pressure and turbine inlet pressure is increased. This raises turbine speed and consequently turbine power. After closing the exhaust bypass, based on an error between actual boost pressure and the desired boost pressure, the exhaust bypass may be further adjusted to maintain boost. The air bypass may be further adjusted based on the surge limit and further based on the boost error, as explained earlier. For example, as the boost error increases, the air bypass opening may be decreased to increase boost pressure, while the air bypass opening may be increased to decrease boost pressure. As such, since the impact of the air bypass adjustment on boost pressure is substantially immediate, by using the air bypass adjustment in concert with the exhaust bypass, a faster and more accurate regulation of boost pressure is achieved.

The intake throttle may be further adjusted to achieve the desired manifold air flow rate. As such, the desired manifold air flow rate may be based on driver torque demand with the air flow rate increased as the torque demand increases. For example, as the actual or estimated manifold air flow resulting from the exhaust bypass and air bypass adjustments becomes lower than a desired air flow rate, the intake throttle opening may be increased to compensate for the errors and increase manifold air flow. As another example, as the actual or estimated manifold air flow resulting from the exhaust bypass and air bypass adjustments becomes higher than a desired air flow rate, the intake throttle opening may be decreased to compensate for the error and decrease manifold air flow. In another example, the intake throttle is actuated directly in response to the actual boost pressure measurement (TIP sensor) that itself responds to the exhaust bypass and the air bypass adjustments. As such, the throttle is adjusted to reduce errors between a desired airflow rate (based on operator torque demand) and actual boost pressure (resulting from the exhaust bypass and air bypass adjustments). Thus, in this way, by adaptively adjusting each of the exhaust bypass, the air bypass, and the intake throttle, the desired boost may be maintained.

Returning to 310, if the compressor is not near or at surge limit when checked at 310, method proceeds to 312, where it is determined if condensation forming conditions are present in the condenser. In one example, condensate forming conditions include when the induction pressure (e.g., the pressure at the outlet of the air cooler, upstream of the throttle) is greater than a threshold pressure, which may be a first threshold pressure. In one example, the threshold pressure may be atmospheric pressure. In another example, the threshold pressure may be a pressure greater than atmospheric pressure. Alternatively or additionally, the controller may determine the induction pressure ratio as the ratio between the induction pressure and atmospheric pressure. As such, condensate forming conditions may include when the induction pressure ratio is greater than 1. In another example, condensate forming conditions include when a humidity is greater than a first threshold. The humidity may either be a measured or inferred humidity. For example, the humidity may be one or more of a measured ambient humidity and/or an intake air humidity. In an alternate example, the humidity may be inferred based on a windshield wiper on/off condition or duty cycle. The first threshold may be based on a humidity level at which condensate is likely to form in the air cooler (also referred to as heat exchanger).

Returning to 312, if condensation forming conditions are present, then method proceeds to 316 where the air bypass opening may be increased. Increasing the opening of the air bypass may decrease the induction pressure and reduce condensate forming conditions in the air cooler. Method then proceeds to 318 where each of the air bypass, the exhaust bypass, and the intake throttle may be adaptively adjusted as explained earlier to maintain engine operation.

However, if condensate forming conditions are not present at 312, the method continues on to 314 where it may be determined if there is a tip-out. In response to a tip-out, where decreased torque is demanded, method proceeds to 316, where the air bypass opening may be increased. Increasing the opening if the air bypass increases recirculation flow to the compressor inlet, and method proceeds to 318 where each of the air bypass, the exhaust bypass, and the intake throttle may be adaptively adjusted and the method ends. In this way, the desired boost levels may be achieved and the engine operation may be maintained.

In one example, a method is provided, the method includes in response to an operator actuated tip-in of an accelerator pedal, opening an air bypass around an air compressor supplying air to an air inlet of an engine for a predetermined time and after said predetermined time, controlling said air bypass based on an error between desired air boost and actual air boost provided by said compressor, said desired boost based in part on position of said accelerator pedal. In this way, the faster turbocharger speed may be translated into reaching higher boost levels in less time than in prior approaches. In such an example, increasing said air bypass may additionally or alternatively be in response to a ratio of outlet pressure to inlet pressure of said compressor being at or around a hard surge limit. In any of the preceding examples, increasing said air bypass may be additionally or alternatively in response to an operator actuated tip-out of said accelerator pedal. Further, the desired boost may be based upon the weight of a vehicle driven by said engine and incline of a road upon which said vehicle is traveling and transmission gear. In any of the preceding examples, the method may additionally or alternatively include cooling said air supplied to the air inlet through an air cooler or heat exchanger. In any of the preceding examples, the method may additionally or alternatively include increasing said air bypass when condensate forming conditions are present in said heat exchanger. In any of the preceding examples, condensate forming conditions may include one or more of the following: a pressure at said air inlet being greater than atmospheric pressure; or humidity of ambient air being greater than a threshold.

Thus, by adaptively adjusting each of the exhaust bypass, the air bypass and the throttle, the engine operation may be maintained. Now turning to FIG. 4, an example concerted adjustment of an exhaust bypass, an air bypass and an intake throttle is shown. The combination allows rapid and accurate boost pressure control, in particular during a tip-in. Map 400 depicts changes in boost pressure at plots 402 and 404, in relation to an operator torque demand at plot 416, an intake throttle (manifold) air flow at plots 406, exhaust bypass or wastegate opening at plot 408, and a an air bypass or compressor recirculation valve opening at plots 410 and 412. In each case, adjustments to each of air bypass, exhaust bypass, and throttle are shown as adjustments made to a two-position valve adjustable to one of a fully closed and a fully open position. However, in other embodiments, the adjustments may be made to continuously variable valves whose positions can be adjusted to a fully open position, a fully closed position, or any position there-between. In each case, the boost pressure reached with delayed closing of the air bypass is shown as solid lines (at plots 402 and 410) and without delay is shown as dashed lines (at plots 404 and 412). The torque demand threshold is shown at plot 414. All plots are depicted over time of engine operation, along the x-axis.

Prior to t1, the engine may be operating with a boost level (plot 402, solid line) below threshold 414. Specifically, the boost level desired may be relatively lower, and thus the engine may be operated with the air bypass closed, the exhaust bypass open, and the throttle closed.

At t1, the torque demand may be greater than a threshold (plot 414), as indicated at plot 416, for example, in response to a tip-in. When a tip-in large enough to require boost is detected, and prior to this tip-in, boost was not initiated or boost level is small (e.g., less than 1inHg, for example), the air bypass may be opened as soon as the tip-in was detected (note that if the air bypass was open prior to the tip-in, for example for surge mitigation, it will remain open) as shown at plot 410. Further, the exhaust bypass is closed (plot 408), and the throttle is opened (plot 406). The initial opening of the air bypass may reduce the initial boost build up as shown at plot 402. However, this opening of air bypass will allow the turbo to spin up faster than if the air bypass was closed (or maintained closed). After a predetermined time has elapsed (between t1 and t2, for example), the air bypass is closed as shown at plot 410. The predetermined time may be based on the time at which estimated turbo speed reaches a threshold, for example. At t2, the air bypass is closed causing the system to build boost rapidly and improve time to torque as shown at plot 402 between time t2 and t3.

If the air bypass was closed immediately at t1, as shown by dashed line 412, the initial boost may be higher as shown at plot 404, however, the rate of rise of the boost pressure (plot 404) may be slower than when the air bypass was closed with a delay (plot 402).

At t3, the torque demand falls below the threshold (414) as shown at plot 416. Between t3 and t4, as the torque demand is decreasing (e.g., tip-out), the air bypass, the exhaust bypass and the throttle may be actively adjusted. For example, the air bypass may be opened, further the exhaust bypass may also be opened, and the throttle may be closed. The combination of opening both the air bypass and the exhaust bypass, allows the boost pressure to fall rapidly towards (plot 402).

At t4, the torque demand may begin to increase. During the time between t4 and t5, the air bypass may be closed, and the exhaust bypass may be maintained open. Further, the throttle may be open. By opening of the air bypass while the exhaust bypass is closed, more compressed air may be directed to the engine intake, increasing boost pressure as shown at plot 402. Further the air bypass, the exhaust bypass and the throttle may be actively adjusted based on one or more of an error between desired air boost and actual air boost, compressor at or near surge limit and further based on condensate forming conditions in the air cooler. Thus, by adaptively adjusting each of the air bypass, the exhaust bypass, and the throttle, the boost pressure may be maintained at the desired levels. Overall, boosted engine performance is improved, providing fuel economy benefits.

After a considerable time has elapsed, the torque demand is shown at plot 416 at time t6. At time t6, the air bypass is open (plot 410), the exhaust bypass is also open (plot 408) and the throttle is open (plot 406). Prior to t7, the boost level desired may be relatively lower as shown at plot 416.

At t7, the torque demand may increase as indicated at plot 416, for example. However, at t8, the torque demand is lower than the threshold 414, as indicated by plot 416. When the driver requested torque demand is small, there is no delay in the closing of the air bypass. Hence, the air bypass is closed (plot 410) at t8. Further, the exhaust bypass and the throttle may also be closed as indicated by plots 408 and 406 respectively. As a result of the combination of the exhaust bypass and air bypass adjustments, the actual boost level (plot 402) may reach the desired boost level soon after t8. Further the air bypass, the exhaust bypass and the throttle may be actively adjusted based on one or more of an error between desired air boost and actual air boost, compressor at or near surge limit and further based on condensate forming conditions in the air cooler.

In this way, adjustments to the exhaust bypass, air bypass, and the throttle may deliver faster and more accurate boost. Overall, boosted engine performance is improved, providing fuel economy benefits.

In one example, a method for increasing boost is provided, the method includes compressing ambient air to supply compressed air to an engine air inlet, supplying ambient air directly to the engine air inlet through a recirculation valve (air bypass) in parallel with the air compressor. In such an example, in response to an operator demand for additional torque from the engine, the method may include opening the recirculation valve for a calibratable time when the additional torque demand exceeds a threshold. After the calibratable time has elapsed, the method may include controlling the recirculation valve based on an error between desired air boost and actual air boost provided by the compressor, where the desired boost may be based in part on the operator demand. The method may further include controlling the compressor may be based on the error between desired air boost and actual air boost provided by the compressor and also controlling both the ambient air entering the air inlet and the compressed air entering the air inlet, by a throttle positioned in proximity to the air inlet, where the control may be based in part on the operator demand. The compressor may be driven by a turbine coupled to an exhaust of said engine and wherein said compressor control comprises bypassing a portion of said engine exhaust around said turbine. The method further includes increasing opening of the recirculation valve in response to a ratio of outlet pressure to inlet pressure of the compressor being at or around a hard surge limit. The method further includes cooling the air supplied to the air inlet through a heat exchanger. The method includes increasing the recirculation valve when condensate forming conditions may be present in said heat exchanger. The method further includes a feed-forward adjustment of the engine exhaust bypassed around the turbine based on the desired boost pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to an operator actuated tip-in of an accelerator pedal, opening an air bypass around an air compressor supplying air to an air inlet of an engine for a predetermined time; and
after said predetermined time, increasing said air bypass in response to a ratio of outlet pressure to inlet pressure of said compressor being at or around a hard surge limit based on an error between desired air boost and actual air boost provided by said compressor, said desired boost based in part on position of said accelerator pedal.

2. The method recited in claim 1, further comprising cooling said air supplied to said air inlet through a heat exchanger.

3. The method recited in claim 2, further comprising increasing said air bypass when condensate forming conditions are present in said heat exchanger.

4. The method recited in claim 3, wherein said condensate forming conditions include one or more of the following: a pressure at said air inlet being greater than atmospheric pressure; or humidity of ambient air being greater than a threshold.

5. A method comprising:
in response to an operator actuated tip-in of an accelerator pedal, opening an air bypass around an air compressor supplying air to an air inlet of an engine for a predetermined time; and
after said predetermined time, controlling said air bypass based on an error between desired air boost and actual air boost provided by said compressor, said desired boost based on a position of said accelerator pedal and weight of a vehicle driven by said engine and an incline of a road upon which said vehicle is traveling.

6. A method comprising:
compressing ambient air to supply compressed air to an engine air inlet;
supplying ambient air directly to said engine air inlet through a recirculation valve in parallel with an air compressor, wherein said compressor is driven by a turbine coupled to an exhaust of an engine and wherein compressor control comprises bypassing a portion of said engine exhaust around said turbine;
in response to an operator demand for additional torque from said engine, opening said recirculation valve for a calibratable time when said additional torque demand exceeds a threshold;
after said calibratable time, controlling said recirculation valve based on an error between desired air boost and actual air boost provided by said compressor, said desired boost based in part on said operator demand;
controlling said compressor based on said error between desired air boost and actual air boost provided by said compressor; and
also controlling both said ambient air entering said air inlet and said compressed air entering said air inlet, by a throttle positioned in proximity to said air inlet, said control based in part on said operator demand.

7. The method recited in claim 6, further comprising cooling said air supplied to said air inlet through a heat exchanger.

8. The method recited in claim 7, further comprising increasing said recirculation valve when condensate forming conditions are present in said heat exchanger.

9. The method recited in claim 6, further comprising a feed-forward adjustment of said engine exhaust bypassed around said turbine based on desired boost pressure.

10. A method comprising:
in response to an operator actuated tip-in of an accelerator pedal, opening an air bypass around an air compressor supplying air to an air inlet of an engine for a predetermined time; and
after said predetermined time, increasing said air bypass in response to an operator actuated tip-out of said accelerator pedal based on an error between desired air boost and actual air boost provided by said compressor, said desired boost based in part on a position of said accelerator pedal.

11. The method recited in claim 10, wherein decreased torque is demanded during tip-out.

12. The method recited in claim 10, wherein the increasing said air bypass increases recirculation flow to a compressor inlet.

13. The method recited in claim 10, further comprising after said predetermined time has elapsed, adaptively adjusting each of said air bypass, an exhaust bypass, and an intake throttle to maintain an engine operation.

14. A method comprising:
compressing ambient air to supply compressed air to an engine air inlet;
supplying ambient air directly to said engine air inlet through a recirculation valve in parallel with an air compressor;
in response to an operator demand for additional torque from an engine, opening said recirculation valve for a calibratable time when said additional torque demand exceeds a threshold;
after said calibratable time, controlling said recirculation valve based on an error between desired air boost and actual air boost provided by said compressor, said desired boost based in part on said operator demand;

controlling said compressor based on said error between desired air boost and actual air boost provided by said compressor;

in response to a ratio of outlet pressure to inlet pressure of said compressor being at or around a hard surge limit, increasing opening of said recirculation valve; and also controlling both said ambient air entering said air inlet and said compressed air entering said air inlet, by a throttle positioned in proximity to said air inlet, said control based in part on said operator demand.

15. The method recited in claim 14, further comprising cooling said air supplied to said air inlet through a heat exchanger.

16. The method recited in claim 15, further comprising increasing said recirculation valve when condensate forming conditions are present in said heat exchanger.

17. The method recited in claim 14, further comprising a feed-forward adjustment of an engine exhaust bypassed around a turbine based on desired boost pressure.

* * * * *